Figures 1, 2:
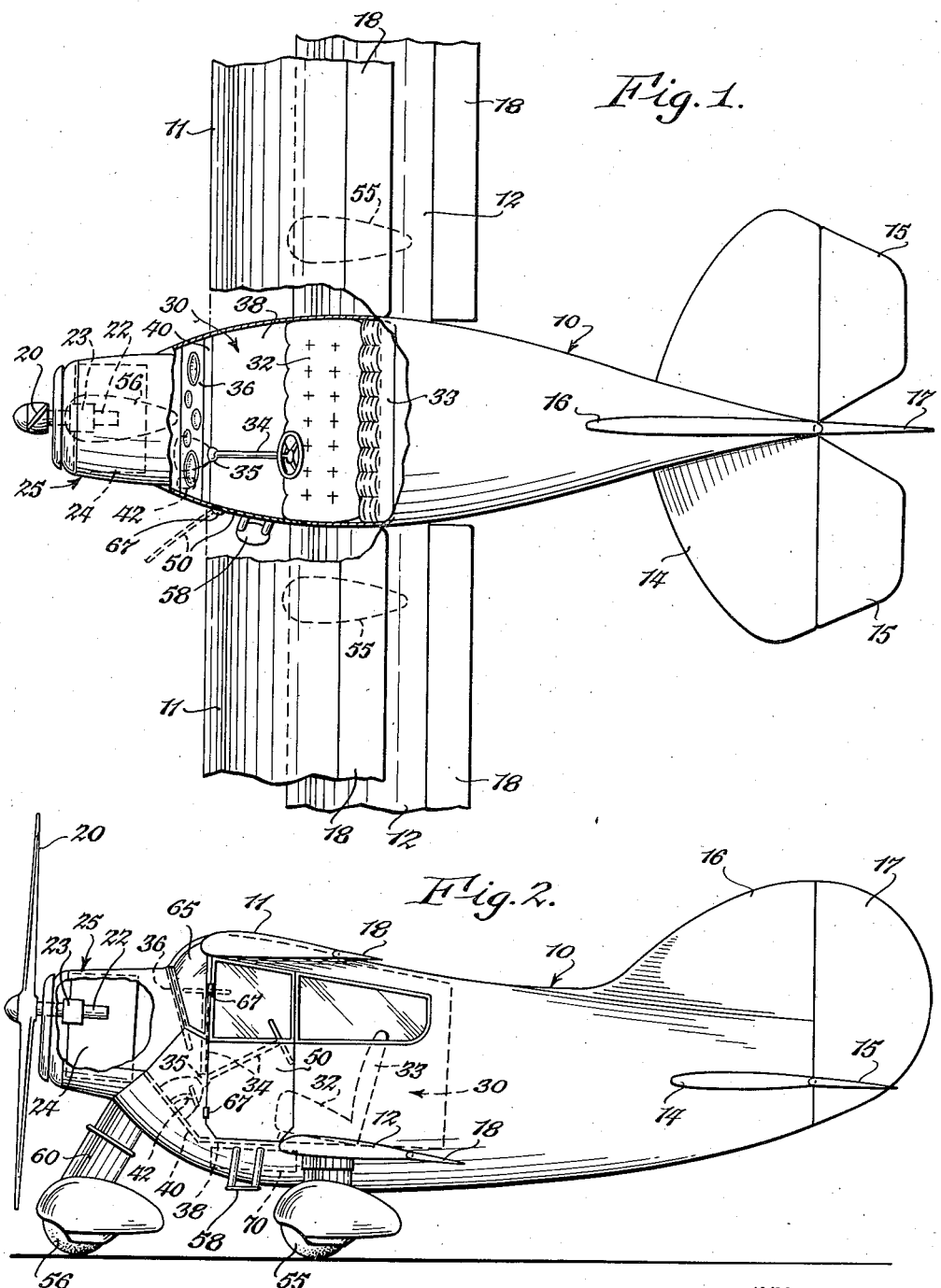

Dec. 19, 1939.  J. M. GWINN, JR  2,183,676

AIRCRAFT

Filed Nov. 20, 1937

INVENTOR
Joseph M. Gwinn, Jr.
BY
Beau, Brooks, Buckley & Beau,
ATTORNEYS

Patented Dec. 19, 1939

2,183,676

UNITED STATES PATENT OFFICE 2,183,676

AIRCRAFT

Joseph M. Gwinn, Jr., Buffalo, N. Y.

Application November 20, 1937, Serial No. 175,671

2 Claims. (Cl. 244—13)

This invention relates to aircraft, and more particularly to the design and relative disposition and arrangement of the primary parts of airplane structures.

In conventional airplane design practice, the relative arrangement and disposition of the primary parts, such as the engines, the cargo and passenger compartments, the wings, and the landing gear structures are determined primarily upon aerodynamical performance and structural stress considerations. For instance, it is elementary that the craft should be stable under both flights and taxiing conditions, and therefore the wings and the landing gear are arranged with special reference to the location of the combined center of gravity of the airplane and its load. Also, the overall dimensions of the airplane should be kept to a minimum for economic reasons. In conformity with such requirements it has heretofore been the custom to relatively locate the main sustaining wings, the empennage, the passenger and cargo carrying compartments, and the engine, upon the fuselage with a sole view to obtaining the desired primary flight characteristics through suitable relative location of the combined center of gravity and the center of pressure effects upon the air pressure receiving surfaces. The undercarriage is arranged with relation to the fuselage and to the center of gravity of the airplane primarily with a view to providing proper earth surface travel performance.

In accordance with the above principles, in previous airplane designs the problems of providing certain flights and taxiing performance characteristics have been given precedence over secondary considerations involving passenger comfort and operating efficiency; and as a result thereof, the airplane engine and the passenger compartment have heretofore been located with reference to the main sustaining wings and the landing gear in such manner that in airplanes having wings connected to side or lower portions of the fuselage no convenient means of entrance and exit for the pilot and passengers in and out of the airplane and to and from the front seat could be provided. This was particularly true in the case of airplanes of the tractor type wherein the propeller is situated forwardly of the wings of the airplane and wherein access to the passenger compartment has been provided for by means located either behind or above the lower wing of the airplane in the form of a door in the side of the fuselage or a reduced portion in the fuselage side wall over which the passenger may climb to get into or out of his seat. This, in combination with the fact that the conventional undercarriage arrangement supports the airplane upon the landing surface in such manner that the passenger seats are disposed at a considerable height above the landing surface and the wings of the airplane and the floor of the passenger compartment are inclined at an angle from the line of the horizon, precluded the possibility of the provision of pilot and passenger accommodating means involving maximum safety and convenience for the user.

Whenever the means for entrance is located behind the wing of an airplane it is then necessary to provide an aisleway leading forwardly toward and between the front seats which are located within the delineations of the wing cell in view of requirements for the location of the center of gravity. This arrangement provides a very inconvenient means of entrance and exist to the seat as it involves walking forwardly up an inclined floor surface toward the rear of the seats. Also, the provision of an aisleway entails considerable lost space and requires an otherwise unnecessary enlargement of the width of the passenger compartment.

Other previous types of arrangements have made it necessary for the passenger to step upon the trailing edge of the lower wing and to walk forwardly and upwardly upon the inclined surface of the wing to a reduced side panel of the fuselage over which he must climb before lowering himself into the seat. Hence, the airplane user has previously been required to clamber over and around a variety of obstacles such as fuselage side panels, sloping wing and floor surfaces, chair backs, and the like, in order to get to and from his seat. Such inconveniences have probably not heretofore been seriously objected to because of a previous disposition on the part of the public to contemplate aircraft as being in the nature of sport equipment, in connection with which the use of special clothing and the endurance of a certain amount of inconvenience have been condoned as being necessary.

To adapt the airplane to every day widespread use for both business and pleasure purposes, however, it has now become of vital necessity to provide the user with every possible convenience and comfort giving feature; and in order to promote a general public feeling of satisfaction and familiarity with airplane equipment, such as practically everyone now possesses with respect to the automobile, it is desirable that the passenger compartment and the arrangement for entrance and exit to and from the seats should be primarily designed for the convenience of the user and should simulate as nearly as may be possible the corresponding appointments of the standard automobile. Furthermore, the passenger compartment should be sufficiently spacious in three dimensions to comfortably accommodate the desired number of passengers; and the control instruments should be so positioned as to be within convenient reach of the pilot but incapable of obstructing the passengers' entrance and exit and use of the passenger compartment. The floor of the compartment should be low to the ground when the airplane is at rest so that a minimum number of upward steps are required to gain access to the compartment; and the floor of the compartment should be horizontally disposed when the plane is at rest so that the passengers may move comfortably to and from their seats. The seats should be arranged at an elevated position and at an angle with reference to the floor so that the limbs of the occupants may assume natural positions; and the point of entrance should be so located with reference to the seats that a minimum distance of travel and only natural body movements are required in connection with entering or leaving the seats.

The undercarriage should be so arranged as to not obstruct the passengers' approach to the point of entrance, and the passengers should be guarded from accidentally coming within reach of the propeller. Also, the passenger compartment should be so arranged and positioned in relation to the other elements of the aircraft that maximum visibility in all directions may be afforded the pilot and passengers. The housing embracing the bearing support for the propeller shaft immediately adjacent the propeller should be of minimum sectional area to reduce obstruction to the propeller airstream immediately behind the propeller; and, finally, all the above arrangements should be provided in combination with an aerodynamically and mechanically efficient airplane structure of the tractor type to procure certain performance characteristic advantages which are well known and obtainable only in connection with that type of airplane.

Among its objects, the present invention aims to provide an improved airplane structure avoiding the aforementioned difficulties and attaining the advantages and objects which are set forth hereinabove and in the following specification, which is of a typical exemplification of the invention.

In the drawing:

Fig. 1 is a fragmentary plan view of an airplane embodying the principles of the invention, with portions of the upper wing and fuselage broken away to show the interior of the passenger compartment, and Fig. 2 is a side elevation of the airplane shown in Fig. 1.

Referring to the drawing, 10 indicates the airplane fuselage upon which is mounted an upper wing 11 and lower wing 12 thus providing an airplane of the bi-plane type. The invention has equal application, however, in connection with any type of airplane having a wing connected to a side or lower portion of the fuselage, such as for example the low-wing monoplane type which may be considered as being represented in the accompanying drawing by assuming the upper wing 11 as being omitted. A tail wing or stabilizer 14 is shown as being provided at the rear end of the fuselage, and in combination with a hinged elevator 15 provides longitudinal control means in accord with well known principles of the aeronautical art. A fixed vertical fin 16 and a vertical rudder 17 hingedly connected thereto provide the directional control means. Ailerons 18, extending in hinged relation from the trailing edges of the main wings, provide the lateral control means for the airplane.

A propeller 20 is fixedly mounted upon an outer extending end portion of a shaft 22 which is rotatably supported upon the fuselage 10, as by means of a bearing 23. The shaft 22 is arranged to be revolved by means of an engine and any suitable interconnecting means. The engine may be either remotely situated with respect to the propeller 20, such as for example in some intermediate interior portion of the fuselage, and operably connected to the propeller through a suitable extension of the shaft 22; or, in the alternative, the engine 24 may be arranged in short-coupled relation with respect to the propeller 20, as shown in the acompanying drawing. In this latter form of arrangement the bearing 23 may be an integral part of the engine. In either case, suitable end thrust bearing means are provided either as a part of the bearing 23 or by any other suitable bearing means (not shown); and a tractor type airplane is thus provided in which the propeller is located ahead of the wings. A casing 25 is provided to house the bearing 23, and in connection with the short coupled form of engine propeller arrangement illustrated in the drawing, the casing 25 is so dimensioned as to also house the engine 24. In either case, however, the sectional dimensions of the casing 25 are kept to a strict minimum in order to reduce the frontal area of the airplane immediately behind the propeller.

A passenger compartment 30 is built into the fuselage and contains a front seat 32 which may be of either the single or divided type. A control column 34 and an instrument and control panel 36 are arranged so as to be within convenient reach of the pilot when seated in the seat 32. The major portion of the floor 38 of the compartment is substantially parallel to the longitudinal thrust axis of the airplane, and a forward portion 40 of the floor slopes upwardly from the floor portion 38 toward the housing 25 and under the rear end portion thereof. Thus, the propeller mounting is relatively short coupled with respect to the main body portion of the fuselage; the body portion immediately behind the propeller is of minimum sectional dimensions; and the downwardly swelling portion of the body just ahead of the major floor portion 38 is available for accommodation of the pilot's feet and control pedals with maximum utility of the available space. Pedals 42 for controlling the airplane travel may be provided adjacent the sloping floor portion 40. The instrument and control panel 36, the control column 34, and the control pedals 42 are all arranged and positioned with reference to the seat 32 with a view to permitting freedom of passenger movement into and out of the compartment 30 and yet being within convenient reach of the pilot when he is seated. To this end the control column 34 is preferably hinged, as at 35, so as to be tiltable upwardly toward the broken line position shown. The seat 32 is preferably slightly inclined with respect to the line of the floor 38, and a seat back 33 is provided to support the passengers in a natural and comfortable attitude. When seated, the passengers find that the inclined floor surface 40 provides a natural and comfortable resting place for their feet, but the floor portion 38 provides a substantially horizontally disposed walking surface for use in moving to and from the seats.

The lower wing 12 and casing 25 are arranged in longitudinally spaced relation upon the fuselage 10, and a portion of the floor surface 38 is disposed within the space between the wing and the casing. A door 50 is hingedly mounted within a complementary opening through a side wall portion of the fuselage for the passengers' convenience in gaining access to the passenger compartment 30. The doorway is longitudinally disposed within the space between the lower wing 12 and the casing 25 and thus, is adjacent a portion of the horizontally disposed floor surface 38.

The seat 32 is positioned longitudinally of the airplane in such manner as to support its occupants in accord with requirements for the combined center of gravity of the airplane and its load. Hence the exact position of the passenger seats 30 will depend upon the relative locations and weights of the various structural and load elements of the airplane, taken in connection with the location, disposition, and relative magnitudes of the various air pressures received by the surfaces of the airplane. In all events, however, the proper location for the most forward seat 30 will probably be adjacent and slightly behind the leading edge of the wing 12 and within the wing cellule as shown in the drawing; and it will be apparent that the seat location will thus be close to the center of gravity of the loaded airplane. Consequently, minimum changes in the center of the gravity location with changes in passenger loading will be experienced, and the resultant changes in longitudinal stability and trim are of minimum character.

The control column 34 and the pedals 42 are arranged to extend from their points of support in such manner as to be within convenient reach of the pilot, when seated. The control column 34, being hinged as at 35, may be folded upwardly and forwardly out of line with the doorway when not in use, to avoid interference with the passenger's movements into and out of the airplane (Fig. 2).

The undercarriage is mounted upon the airplane in such manner as to provide an adequately broad base support about the airplane center of gravity, and at the same time to avoid obstructing the passenger's approach to the door 50. For instance, a three wheel gear is illustrated wherein a pair of directionally fixed wheels 55 are arranged at opposite sides of the fuselage and under the wings 12 and longitudinally behind the combined center of gravity of the airplane and its load. A single castering front wheel 56 is mounted beneath the casing 25 along the center line of the fuselage and forward of the center of gravity of the airplane and its load. Thus, a tricycle form of running gear is provided for supporting the airplane upon the ground; and a means of entrance and exit has been provided whereby the passengers may approach the passenger compartment without the necessity of dodging or clambering over any obstacles, and gain or leave their seats in a natural and convenient manner.

The main sustaining wings 11 and 12, or the wing 12 alone in the case of a low wing monoplane construction, are connected to the fuselage in low angle of attack relation, and the ailerons 18 may be arranged to be actuated by the pilot in the manner of landing flaps independently of their lateral control functioning. The structural elements of the undercarriage are so proportioned and arranged as to support the airplane upon the ground in its normal flight attitude, that is with its longitudinal flight thrust axis disposed substantially parallel to the horizon. By reason of this arrangement, the fuselage of the airplane, when grounded or during normal level flight, is disposed at substantially the same attitude, and the major floor surface 38 is arranged with relation to the fuselage so as to be approximately horizontally disposed under these conditions.

In taking off, either one of the two procedures may be employed. The elevator may be left in neutral and the ship taxied until flying speed is attained, at which time the flaps 18 are depressed to increase the lift capacity of the wings. In response to this maneuver the airplane will rise from the ground in an approximately horizontal attitude. Or, in the alternative, when flying speed is attained the elevator may be raised to lower the tail of the craft, thus disposing the fuselage and the sustaining wings at an increased lift capacity angle, much in the manner of the take-off of a conventional type airplane.

In landing, the pilot again has his choice of employing either one of the two procedures. The motor may be idled, and without changing the longitudinal attitude of the airplane, it will simply settle or fly onto the ground. The undercarriage is preferably provided with ample shock absorbing means to soften the landing. Or, in the alternative, the ship may be nosed downwardly in the usual manner and then levelled off just prior to ground contact. Further reduction of speed then causes the craft to settle into ground contact, and in either case the undercarriage meets the ground and supports the airplane in an attitude similar to the normal flight attitude. Therefore, the floor surface 38 is substantially horizontally disposed whenever the airplane is at rest or in normal flight attitude, and there is thus provided a most convenient form of surface for the passengers to walk upon in connection with their movements to and from their seats.

There has thus been provided a fuselage shape which comprises in essence a reduced forward end portion, a radially expanding or outwardly flaring portion immediately behind the reduced end portion, and an enlarged main body portion adjoining the opposite end of the expanding portion; all three portions being arranged in substantially longitudinally concentric relation.

The relative arrangement of the casing 25, and the lower wing 12, and the seat 32 enables this shaping of the fuselage with a greatly reduced frontal area immediately adjacent and behind the propeller (as defined by the requirements of the forward support of the propeller shaft), and thence swelling downwardly and toward the rear to a point near the region of the doorway and the leading edge of the wing 12 which is relatively low to the ground when the airplane is at rest. Thus the added advantages of a small airstream obstructing area immediately behind the propeller are obtained, in combination with the advantages of a low step into the passenger compartment through a doorway located ahead of the wing and the passenger seat. If necessary, an extra step member 58 may be provided between the level of the floor surface 38 and the level of the ground to reduce the extent of any single step upwardly into the passenger compartment. In this manner a means of entrance and exit into the passenger compartment and into the passenger seats has been provided which is comparable in convenience with the arrangements provided in present day automobiles.

The casing 25 is formed as nearly as practicable in concentric relation with respect to the axis of the propeller shaft 22 for aerodynamic efficiency and stability purposes. The relatively large lateral and upward spread of the passenger compartment immediately behind its point of connection with the bearing casing 25 permits the provision of ample frontal surfaces in the walls of the passenger compartment above and to either side of the lines of the casing 25 in which windows 65 are provided for permitting full visibility in all directions from the pilot's seat. The sharp downward extension of the fuselage immediately behind the casing 25 permits an undercarriage arrangement which brings the floor line of the passenger compartment in the region ahead of the main wing in close proximity to the ground level, and at the same time the propeller is disposed at sufficient altitude to provide ample clearance between the propeller and the ground.

The forward wheel 56 is mounted upon the fuselage 10 by means of any suitable shock absorbing strut device which is preferably encased by a two-piece streamlined housing 60. The upper end of the wheel mounting structure is connected to the end portion of the fuselage adjacent its point of maximum reduction in sectional dimension, and hence an unusually long shock absorbing unit may be employed without requiring an undesirable elevating of the entire fuselage. It is particularly advantageous to provide a shock absorbing unit capable of long relative movement of its parts in connection with the support of the front wheels of the landing gear, to take care of nose-down landings. The door 50 is preferably hinged as at 67 to the side wall of the passenger compartment at its side nearest the propeller 20 so that when opened outwardly, the door acts as a guard between the propeller and passengers entering or leaving the airplane by means of the doorway. The space between the horizontal floor portion 38 and the bottom surface of the fuselage 10 which is occasioned by the streamlining of the fuselage provides a particularly advantageous location for the fuel tank 70 of the airplane because it coincides with the approximate longitudinal location of the center of gravity of the airplane. Hence, variations in the weight of the load carried by the tank 70 will not appreciably alter the balance of the airplane.

Thus an airplane has been provided which incorporates maximum aerodynamical and mechanical operating efficiency in combination with utmost passenger safety and comfort. Although only one form of the invention has been shown and described in detail, it will be apparent to those skilled in the art that the invention is not so limited, but that various changes can be made therein without departing from the spirit of the invention or from the scope of the appended claims.

I claim:

1. In an airplane of the tractor type having a fuselage, an engine mounted at the forward end of said fuselage and completely encased by a housing of substantially uniform sectional dimensions throughout its length, said housing joining at its rear end a section of said fuselage which expands both in side view and plan view rearwardly from the junction with said housing to an enlarged portion thereof enclosing a passenger compartment having a floor and a passenger seat, a passenger doorway through a side wall portion of said passenger compartment adjacent said floor and ahead of said seat, a wing extending from opposite side wall portions of said passenger compartment and disposed aft of the rear edge of said doorway, a longitudinal stabilizer for said airplane mounted upon said fuselage and disposed aft of said wing, a tricycle type landing gear including a pair of directionally fixed wheels connected at opposite sides of said fuselage and aft of the center of gravity of the loaded airplane and a single castering wheel forwardly of said center of gravity and along the plan view center line of said fuselage and connected thereto adjacent the junction between the rear end of said engine housing and the forward end of said expanding fuselage portion, a propeller mounted upon a shaft extending forwardly from said engine, the junction between the upper rear portion of said housing and said expanding fuselage portion being a substantial distance aft of the junction between the lower rear portion of said housing and said expanding fuselage portion whereby a space for accommodating the feet of the passengers is provided in said passenger compartment in the region of said expanded fuselage portion and below the rear end portion of said housing and said engine is located close to the center of pressure of said wing without interfering with the comfortable seating accommodation of said passengers, and a door for said passenger doorway hingedly mounted at its forward edge portion upon said fuselage between said engine and said wing and swingable toward open position in such manner as to constitute a guard between said propeller and the line of passenger approach to said doorway.

2. In an airplane of the tractor type having a fuselage, an engine mounted at the forward end of said fuselage and completely encased by a housing of substantially uniform sectional dimensions throughout its length, said housing joining at its rear end a section of said fuselage which expands both in side view and plan view rearwardly from the junction with said housing to an enlarged portion thereof enclosing a passenger compartment having a floor and a passenger seat, a passenger doorway through a side wall portion of said passenger compartment adjacent said floor and ahead of said seat, a wing extending from opposite side wall portions of said passenger compartment and disposed aft of the rear edge of said doorway, a longitudinal stabilizer for said airplane mounted upon said fuselage and disposed aft of said wing, a tricycle type landing gear including a pair of directionally fixed wheels connected at opposite sides of said fuselage and aft of the center of gravity of the loaded airplane and a single castering wheel forwardly of said center of gravity and along the plan view center line of said fuselage and connected thereto adjacent the junction between the rear end of said engine housing and the forward end of said expanding fuselage portion, a propeller mounted upon a shaft extending forwardly from said engine, and a door for said passenger doorway hingedly mounted at its forward edge portion upon said fuselage between said engine and said wing and swingable toward open position in such manner as to constitute a guard between said propeller and the approach to said doorway, and a pilot control member mounted upon said fuselage and normally extending inwardly of said passenger compartment and into the line of said passenger doorway and being swingable about its mounting connection to avoid interfering with access of the passengers to and from said passenger seat.

JOSEPH M. GWINN, JR.